(12) United States Patent
Tran et al.

(10) Patent No.: US 12,353,114 B2
(45) Date of Patent: Jul. 8, 2025

(54) IMAGING DEVICE WITH ILLUMINATION COMPONENTS

(71) Applicant: NEOGEN CORPORATION, Lansing, MI (US)

(72) Inventors: Thanh Quoc Tran, Lansing, MI (US); Hugh Eugene Watson, Lansing, MI (US); Jitesh Narendra Joshi, Lansing, MI (US)

(73) Assignee: NEOGEN FOOD SAFETY US HOLDCO CORPORATION, Lansing, MI (US)

( * ) Notice: Subject to any disclaimer, the term of this patent is extended or adjusted under 35 U.S.C. 154(b) by 0 days.

(21) Appl. No.: 18/628,637

(22) Filed: Apr. 5, 2024

(65) Prior Publication Data

US 2024/0393663 A1 Nov. 28, 2024

Related U.S. Application Data

(62) Division of application No. 17/904,847, filed as application No. PCT/IB2021/053541 on Apr. 28, 2021, now Pat. No. 11,977,321.

(30) Foreign Application Priority Data

May 13, 2020 (IN) .............................. 202041020177

(51) Int. Cl.
*G03B 15/05* (2021.01)

(52) U.S. Cl.
CPC .................................... *G03B 15/05* (2013.01)

(58) Field of Classification Search
None
See application file for complete search history.

(56) References Cited

U.S. PATENT DOCUMENTS

| 6,201,639 | B1 * | 3/2001 | Overbeck | B01L 3/0241 |
| | | | | 359/368 |
| 11,977,321 | B2 * | 5/2024 | Tran | G01N 21/8806 |
| 2003/0090749 | A1 * | 5/2003 | Branson | H04N 1/0286 |
| | | | | 358/509 |
| 2016/0296119 | A1 * | 10/2016 | Nakamura | A61B 5/0075 |
| 2017/0294470 | A1 * | 10/2017 | Takami | H10F 39/182 |
| 2020/0088988 | A1 * | 3/2020 | Tanaka | G02B 19/0019 |
| 2021/0263380 | A1 * | 8/2021 | Chen | G02F 1/133605 |

* cited by examiner

*Primary Examiner* — Clayton E. LaBalle
*Assistant Examiner* — Diana Hancock
(74) *Attorney, Agent, or Firm* — HYLTON-RODIC LAW PLLC

(57) ABSTRACT

The technology disclosed herein relates to an imaging device. In some embodiments the imaging device has a support plate defining an object plane. A housing surrounds the object plane across the support plate. A first reflector plane is within the housing and in reflective communication with the object plane. The first reflector plane is 68.0° to 70.0° from the object plane. A second reflector plane within the housing and in reflective communication with the object plane. The second reflector plane is 68.0° to 70.0° from the object plane. Other embodiments are also described.

21 Claims, 6 Drawing Sheets

IMAGING DEVICE WITH ILLUMINATION COMPONENTS

CROSS REFERENCE TO RELATED APPLICATIONS

This application is a continuation (divisional) application of U.S. application Ser. No. 17/904,847, filed on Aug. 23, 2022, which is a U.S. national phase application of PCT/IB2021/053541, filed Apr. 28, 2021, which claims priority to Indian Appl. No 202041020177, filed May 13, 2020, the contents of which are hereby incorporated by reference in their entirety.

TECHNOLOGICAL FIELD

The present disclosure is generally related to an imaging device. More particularly, the present disclosure is related to an imaging device with illumination components.

BACKGROUND

Imaging devices are used in a variety of industries to optically record or interpret visual data. The quality of the optical record can depend on a variety of factors including, but not limited to, the lighting that illuminates the visual data. Uneven lighting can negatively impact the quality of the visual data that is observed or recorded, which may negatively impact how the visual data is interpreted.

One example type of imaging device that is dependent on the quality of the lighting is an imaging device for biological growth plates. Biological growth plates can be used to test for biological contaminants in foods, medical samples, and other sources. For example, a food sample or laboratory sample can be placed on a biological growth plate, and then the plate can be inserted into an incubation chamber. After incubation, the biological growth plate can be placed into the imaging device for detection and enumeration of bacterial growth. The imaging device is used to scan or count bacterial colonies, or the amount of a particular biological agent, on the biological growth plate. The imaging device can automate the detection and enumeration of bacteria or other biological agents on a biological growth plate, and thereby improve the biological testing process by reducing human error.

SUMMARY

Some embodiments of the technology disclosed herein relates to an imaging device. The imaging device has a support plate defining an object plane. A housing surrounds the object plane across the support plate. A first reflector plane is within the housing. The first reflector plane is 68.0° to 70.0° from the object plane. The first reflector plane is in reflective communication with the object plane. A second reflector plane is within the housing. The second reflector plane is 68.0° to 70.0° from the object plane. The second reflector plane is in reflective communication with the object plane.

In some such embodiments, each of the first reflector plane and the second reflector plane each have a distal end relative to the object plane, and the distal end of the first reflector plane is 67.5 mm to 70.5 mm from the distal end of the second reflector plane. Additionally or alternatively, a distance between a distal end of the first reflector plane and the object plane is 102.0 mm to 112.0 mm. Additionally or alternatively, an image capture device is coupled to the housing. The image capture device has an optical lens. A distance between the optical lens and the object plane is 166 mm to 178.0 mm. Additionally or alternatively, the first reflector plane has a length of at least 94.5 in a direction parallel to the object plane.

Additionally or alternatively, the imaging device has a back illumination device coupled to the housing. The back illumination device has a back emitter face opposite the object plane relative to the support plate, where the back emitter face is 1.5 mm to 4.5 mm from the object plane, and the back emitter face is configured to transmit diffuse light through the object plane. Additionally or alternatively, the first reflector plane and second reflector plane each have a gloss of 81-88 at a 60° angle, in accordance with ASTM D 523-18. Additionally or alternatively, the imaging device has a first waveguide coupled to the housing, where the first waveguide has a first interior reflective surface, and the first waveguide defines a first optical inlet through the first interior reflective surface and a first optical outlet through the first interior reflective surface. Additionally or alternatively, the first optical outlet is 11.5° to 14.5° from the object plane.

Additionally or alternatively, the imaging device has a first light source coupled to the first waveguide about the first optical inlet, wherein the first light source defines a first source emitter face that is radially outward from the first interior reflective surface relative to the first central axis. Additionally or alternatively, the first source emitter face is 1.2 mm to 2.2 mm radially outward from the first interior reflective surface relative to the first central axis.

Additionally or alternatively, the imaging device has a second waveguide coupled to the housing, where the second waveguide has a second interior reflective surface, and the second waveguide defines a second optical inlet through the second interior reflective surface and a second optical outlet through the second interior reflective surface. Additionally or alternatively, the second optical outlet is 11.5° to 14.5° from the object plane. Additionally or alternatively, a second light source is coupled to the second waveguide about the second optical outlet, where the second light source defines a second source emitter face that is radially outward from the second interior reflective surface relative to the second central axis. Additionally or alternatively, the second source emitter face is 1.2 mm to 2.2 mm radially outward from the second interior reflective surface relative to the second central axis.

Additionally or alternatively, the first waveguide defines a first central axis that is 134.5 mm to 139.3 mm from a second central axis defined by the second waveguide. Additionally or alternatively, a distance between the object plane and a first central axis defined by the first waveguide is 42.0 mm to 45.0 mm.

Some embodiments of the technology disclosed herein relate to an imaging device having a support plate defining an object plane. a housing surrounds the object plane across the support plate. A first waveguide is coupled to the housing, where the first waveguide has a first interior reflective surface. The first waveguide defines a first optical inlet through the first interior reflective surface and a first optical outlet through the first interior reflective surface, where the first optical outlet is 11.5° to 14.5° from the object plane. A second waveguide is coupled to the housing, where the second waveguide has a second interior reflective surface. The second waveguide defines a second optical inlet through the second interior reflective surface and a second optical outlet through the second interior reflective surface. The second optical outlet is 11.5° to 14.5° from the object plane.

In some such embodiments the first waveguide defines a first central axis that is 134.5 mm to 139.3 mm from a second central axis defined by the second waveguide. Additionally or alternatively, a distance between the object plane and a central axis defined by the first waveguide is 42.0 mm to 45.0 mm. Additionally or alternatively, a first light source is coupled to the first waveguide about the first optical inlet, where the first light source defines a first source emitter face that is radially outward from the first interior reflective surface relative to the first central axis. Additionally or alternatively, the first source emitter face is 1.2 mm to 2.2 mm radially outward from the first interior reflective surface relative to the first central axis. Additionally or alternatively, a second light source is coupled to the second waveguide about the second optical outlet, where the second light source defines a second source emitter face that is radially outward from the second interior reflective surface relative to the second central axis.

Additionally or alternatively, the imaging device has a first reflector plane coupled to the housing. The first reflector plane is 68.0° to 70.0° from the object plane, where the first reflector plane is in reflective communication with the object plane. A second reflector plane is coupled to the housing. The second reflector plane is 68.0 to 70.0° from the object plane. The second reflector plane is in reflective communication with the object plane. Additionally or alternatively, each of the first reflector plane and the second reflector plane have a distal end relative to the object plane, and the distal end of the first reflector plane is 67.5 mm to 70.5 mm from the distal end of the second reflector plane. Additionally or alternatively, a distance between a distal end of the first reflector plane and the object plane is 102.0 mm to 112.0 mm. Additionally or alternatively, the first reflector plane and second reflector plane each have a gloss of 81-88 at a 20° angle, in accordance with ASTM D 523-18.

Additionally or alternatively, an image capture device coupled to the housing, the image capture device having an optical lens, wherein a distance between the optical lens and the object plane is 166 mm to 178.0 mm. Additionally or alternatively, a back illumination device is coupled to the housing, where the back illumination device has a back emitter face opposite the object plane relative to the support plate. The back emitter face is 1.5 mm to 4.5 mm from the object plane, and the back emitter face is configured to transmit diffuse light through the object plane.

Some embodiments of the current technology relate to an imaging device having a support plate defining an object plane. A housing surrounds the object plane across the support plate. A first waveguide is coupled to the housing, where the first waveguide has a first interior reflective surface. The first waveguide defines a first optical inlet through the first interior reflective surface and a first optical outlet through the first interior reflective surface. A first light source is coupled to the first waveguide about the first optical inlet. The first light source defines a first source emitter face that is radially outward from the first interior reflective surface relative to the first central axis.

In some such embodiments, the first source emitter face is parallel to the first optical inlet. Additionally or alternatively, the first source emitter face is 1.2 mm to 2.2 mm radially outward from the first interior reflective surface relative to the first central axis. Additionally or alternatively, a second waveguide is coupled to the housing. The second waveguide has a second interior reflective surface. The second waveguide defines a second optical inlet through the second interior reflective surface and a second optical outlet through the second interior reflective surface. A second light source is coupled to the second waveguide about the second optical outlet. The second light source defines a second source emitter face that is radially outward from the second interior reflective surface relative to the second central axis. Additionally or alternatively, the second source emitter face is 1.2 mm to 2.2 mm radially outward from the second interior reflective surface relative to the second central axis.

Additionally or alternatively, the first optical outlet is 11.5° to 14.5° from the object plane. Additionally or alternatively, the second optical outlet is 11.5° to 14.5° from the object plane. Additionally or alternatively, the first waveguide defines a first central axis that is 134.5 mm to 139.3 mm from a second central axis defined by the second waveguide. Additionally or alternatively, a distance between the object plane and a central axis defined by the first waveguide is 42.0 mm to 45.0 mm. Additionally or alternatively, a first reflector plane is coupled to the housing, where the first reflector plane is 68.0° to 70.0° from the object plane. The first reflector plane is in reflective communication with the object plane. A second reflector plane is coupled to the housing, where the second reflector plane is 68.0° to 70.0° from the object plane. The second reflector plane is in reflective communication with the object plane.

Additionally or alternatively, each of the first reflector plane and the second reflector plane have a distal end relative to the object plane, and the distal end of the first reflector plane is 67.5 mm to 70.5 mm from the distal end of the second reflector plane. Additionally or alternatively, a distance between a distal end of the first reflector plane and the object plane is 102.0 mm to 112.0 mm. Additionally or alternatively, the first reflector plane and second reflector plane each have a gloss of 81-88 at a 20° angle, in accordance with ASTM D 523-18. Additionally or alternatively, an image capture device is coupled to the housing, the image capture device having an optical lens, where a distance between the optical lens and the object plane is 166 mm to 178.0 mm. Additionally or alternatively, a back illumination device is coupled to the housing. The back illumination device has a back emitter face opposite the object plane relative to the support plate, where the back emitter face is 21.5 mm to 4.5 mm from the object plane, and the back emitter face is configured to transmit diffuse light through the object plane.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The technology disclosed herein generally relates to an imaging device that has illumination components. The illumination components are configured to illuminate an object plane of the imaging device for improved optical clarity.

Figure 1:
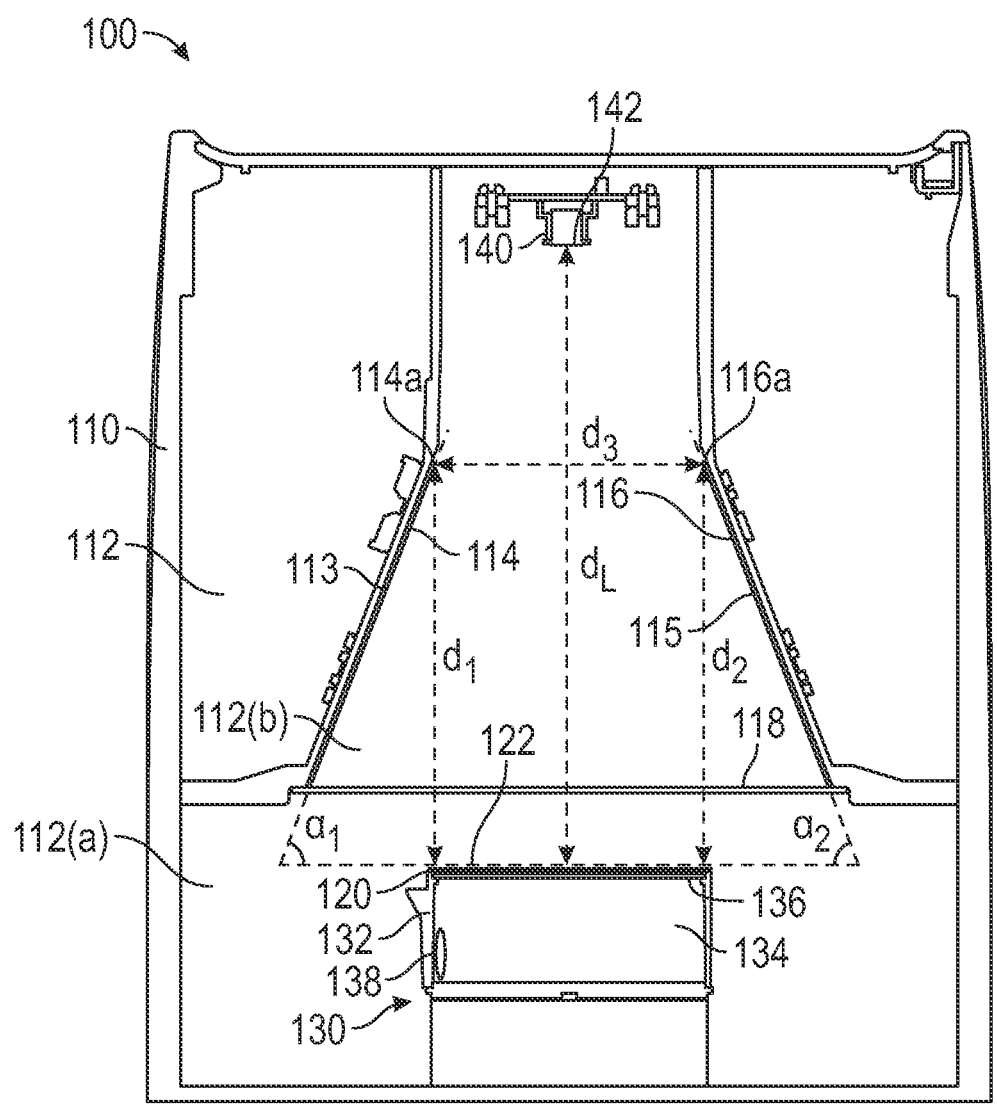
FIG. 1 is a schematic cross-sectional view of an example imaging device consistent with various embodiments.

FIG. 1 depicts a schematic cross-sectional view of an example imaging device, consistent with various embodiments. The imaging device 100 is generally configured to receive and scan an object. The imaging device 100 has a support plate 120 that is configured to receive an object for imaging by the imaging device 100.

The imaging device 100 has a housing 110 that defines a cavity 112. The support plate 120 is disposed in the cavity 112 of the housing 110. The surface of the support plate 120 that receives the object for imaging defines an object plane 122 that is configured to be scanned by the imaging device 100. The housing 110 generally surrounds the object plane 122 across the support plate 120. The housing 110 can be configured to isolate the object plane 122 of the support plate 120 from ambient light. The housing 110 can be configured to isolate the support plate 120 from the ambient environment.

The imaging device 100 has an image capture device 140 that is configured to capture an image of the object plane 122 of the support plate 120. The image capture device 140 is positioned in the cavity of the housing 110. In various embodiments, the image capture device 140 is positioned vertically above the object plane 122 of the support plate 120. The image capture device 140 can be coupled to the housing 110. The image capture device 140 can be a camera, in various embodiments. The image capture device 140 can be a line or area scanner. The image capture device 140 can have an optical lens 142 that is positioned over the support plate 120. The optical lens 142 is generally configured to be in optical communication with the object plane 122 across the support plate 120.

The object plane 122 of the support plate 120 is generally positioned to be the focal point of the optical lens 142. The distance $d_L$ between the optical lens and the object plane 122 of the support plate 120 may be critical in some implementations to balance the image resolution of the image capture device 140, the size of the area of the support plate 120 that will be imaged, and the field of view of the optical lens, as examples. The distance $d_L$ between the optical lens and the object plane is generally at least 166.0 mm. The distance $d_L$ between the optical lens and the object plane is generally no more than 178.0 mm. In some embodiments, the distance $d_L$ between the optical lens and the object plane is 168.5 mm to 175.7 mm. In some embodiments, the distance $d_L$ between the optical lens and the object plane is 171.2 mm to 173.2 mm. The distance $d_L$ can generally be determined in a direction perpendicular to the object plane 122.

In various embodiments, the imaging device 100 has one or more light sources that are configured to illuminate the object plane 122 of the support plate 120 for imaging by the image capture device 140. In the current example, one such light source is a back illumination device 130. The back illumination device 130 is generally coupled to the housing 110. The back illumination device 130 has a back emitter face 136 that is generally configured to emit light. The back emitter face 136 is opposite the object plane 122 relative to the support plate 120. The object plane 122 is positioned between the back emitter face 136 and the optical lens 142 such that light is emitted from the back emitter face 136 through the object plane 122 towards the optical lens 142.

In various embodiments the back emitter face 136 is configured to transmit diffuse light through the object plane 122. The material forming the back emitter face 136 can be transparent or translucent. The back emitter face 136 can be constructed of glass, plastic, crystal, or other materials. The back emitter face 136 can be a translucent material, such as frosted glass. The back emitter face 136 can be parallel to the support plate 120, in some embodiments. In some embodiments, the back emitter face 136 abuts the support plate 120, where "abuts" is intended to mean that the back emitter face 136 and the support plate 120 are touching. In some embodiments, the back emitter face 136 and the support plate 120 are adjacent, with a spacing region defined between them.

In some implementations, the distance between the back emitter face 136 and the object plane 122 may be critical to even illumination of the object plane 122 across the support plate 120. The distance between the back emitter face 136 and the object plane 122 may be large enough to contribute to diffusion of light emitted by the back emitter face 136, but small enough such that the light emitted by the back emitter face 136 illuminates the object plane 122 across the support plate 120 evenly. In some embodiments the back emitter face 136 is at least 1.5 mm from the object plane 122. In some embodiments the back emitter face 136 is no more than 4.5 mm from the object plane 122. The back emitter face can be 2.25 mm to 3.75 mm from the object plane or 2.5 mm to 3.5 mm from the object plane.

In the current example, the back illumination device 130 has a shell 132 defining an illumination cavity 134. The back illumination device 130 has a back emitter face 136 coupled to the shell 132. The back emitter face 136 extends across the illumination cavity 134. One or more light generation devices 138 are disposed in the illumination cavity 134. The light generation device 138 is configured to emit light in the illumination cavity 134. The light generation device 138 can be a variety of different types of devices that generates light. In some embodiments, the light generation device 138 can be a single light generation device or an array of multiple light generation devices. Where an array of multiple light generation devices is employed, the light generation devices can be activated individually and/or in combination to provide light. In some embodiments, the light generation device 138 has separate light emitting diode (LED) elements that provide red, green, and a blue light. The LED elements can be separately activated to provide a selected color of light. Upon activation of the individual LED elements, light from the light generation device 138 emits light through the back emitter face 136.

The light can be reflected off of various inner surfaces of the back illumination device 130. The light can be transmitted through the back emitter face 136 towards the support plate 120. In some alternate embodiments, the back emitter face 136 of the back illumination device 130 can be defined by a light generation device itself, such as a light emitting diode (LED) or other device.

In various embodiments, the support plate 120 that is generally configured to transmit light therethrough. The support plate 120 is configured to transmit light through the object plane to the optical lens 142 of the image capture device 104. The support plate 120 is generally transparent and can be constructed of glass, plastic, crystal, and the like. In embodiments, light generated by the back illumination device 130 is transmitted through the support plate 120.

The imaging device 100 has a first reflector plane 114 within the housing 110. The first reflector plane 114 is configured to be in reflective communication with the object plane 122. The first reflector plane 114 can be configured to reflect light generated by the one or more light sources of the imaging device 100 towards the object plane 122. In embodiments incorporating a back illumination device 130, the first reflector plane 114 can be configured to reflect light emitted by the back emitter face 136 towards the object plane 122. The first reflector plane 114 is generally a planar surface defined by an inner surface of the housing 110 itself or, alternatively, defined by a separate component that is coupled to the housing 110. In the current example, the first reflector plane 114 is defined by a first panel 113 that is coupled to an inner surface of the housing 110. In some embodiments the first reflector plane 114 is defined by a coating on an inner surface of the housing 110 or a coating on the first panel 113.

It has been discovered that the angle $\alpha_1$ between the first reflector plane 114 and the object plane 122 may be critical to some implementations of the current technology. In particular, the angle $\alpha_1$ between the first reflector plane 114 and the object plane 122 can dictate the quality of the illumination of the object plane 122 across the support plate 120. If the angle $\alpha_1$ between the first reflector plane 114 and the object plane 122 is too large or too small, the illumination of the object plane 122 across the support plate 120 may be uneven. If the angle $\alpha_1$ is too large, the first reflector plane 114 may reflect less light on a central region of the support plate 120 than a region outside the central region, such as a first edge region of the support plate 120. If the angle $\alpha_1$ is too small, the first reflector plane 114 may reflect more light on the central region of the support plate 120 than the first edge region of the support plate 120.

The first reflector plane 114 is generally oblique to the object plane 122. In various embodiments, the first reflector plane 114 is at an angle $\alpha_1$ of at least 68.0° from the object plane 122, where the angle $\alpha_1$ can be in the clockwise or counterclockwise direction. In various embodiments, the first reflector plane 114 is at an angle $\alpha_1$ of no more than 70.0° from the object plane 122. In some embodiments, the first reflector plane 114 is at an angle $\alpha_1$ of 68.0° to 70.0° from the object plane 122. In some embodiments, the first reflector plane 114 is at an angle $\alpha_1$ of 68.5° to 69.5° from the object plane 122. The angle $\alpha_1$ of the first reflector plane 114 relative to the object plane 122 can advantageously improve the uniformity of illumination of the object plane 122. The angle $\alpha_1$ of the first reflector plane 114 relative to the object plane 122 can advantageously contribute to a reduction in glare off of the support plate 120 towards the image capture device 140.

The spacing of the first reflector plane 114 and the object plane 122 can advantageously improve the illumination of the object plane 122 by the first reflector plane 114. The first reflector plane 114 generally has a distal end 114a relative to the object plane 122, where "distal end" is intended to mean the end that is furthest from the object plane 122. The distal end 114a of the first reflector plane 114 can have a perpendicular distance $d_1$ of at least 102 to the object plane 122. The distal end 114a of the first reflector plane 114 can have a perpendicular distance $d_1$ of no more than 112 mm to the object plane 122. The distal end 114a of the first reflector plane 114 can have a perpendicular distance $d_1$ of 103.0 mm to 108.5 mm to the object plane 122. The distal end 114a of the first reflector plane 114 can have a perpendicular distance $d_1$ of 104.0 mm to 105.0 mm to the object plane 122. The distance $d_1$ may be critical to some implementations to ensure even illumination of the object plane 122 across the support plate 120. If the distance $d_1$ is too large, portions of the object plane 122, such as a central region of the support plate 120 may not receive enough light. If the distance $d_1$ is too small, portions of the support plate 120 may receive too much light.

In various embodiments, the first reflector plane 114 is configured to reflect diffuse light within the cavity 112. The first reflector plane 114 can have a gloss of 81 to 88 at a 60° angle, in accordance with ASTM D 523-18 (2015). The first reflector plane 114 can have a gloss of 49 to 59 at a 20° angle, in accordance with ASTM D 523-18 (2015). The first reflector plane 114 can have a whiteness of greater than or equal to 75 in accordance with ASTM E313-15 (2015). In one example, the first panel 113 is coated a plurality of layers of Duxone®, Glossy White, by Axalta Coating Systems headquartered in Philadelphia, Pennsylvania. The first reflector plane 114 may be a spray coating.

The imaging device 100 has a second reflector plane 116 within the housing 110. The second reflector plane 116 is configured to be in reflective communication with the object plane 122. The second reflector plane 116 can be configured to reflect light generated by the one or more light sources of the imaging device 100 towards the object plane 122. In embodiments incorporating a back illumination device 130, the second reflector plane 116 can be configured to reflect light emitted by the back emitter face 136 towards the object plane 122. The second reflector plane 116 is generally a planar surface defined by an inner surface of the housing 110 itself or, alternatively, defined by a separate component that is coupled to the housing 110. In the current example, the second reflector plane 116 is defined by a second panel 115 that is coupled to an inner surface of the housing 110. In some embodiments the second reflector plane 116 is defined by a coating on an inner surface of the housing 110 or a coating on the second panel 115.

The second reflector plane 116 is generally oblique to the object plane. In various embodiments, the second reflector plane 116 is at an angle $\alpha_2$ from the object plane 122 that is in the opposite direction of the angle $\alpha_1$ of the first reflector plane 114 from the object plane 122. Similar to the first reflector plane 114, the angle $\alpha_2$ of the second reflector plane 116 relative to the object plane 122 may be critical in some implementations. The second reflector plane 116 is at an angle $\alpha_2$ of at least 68.0° from the object plane 122. In various embodiments, the second reflector plane 116 is at an angle $\alpha_2$ of no more than 70.0° from the object plane 122. In some embodiments, the second reflector plane 116 is at an angle $\alpha_2$ of 68.0° to 70.0° from the object plane 122. In some embodiments, the second reflector plane 116 is at an angle $\alpha_2$ of 68.5° to 69.5° from the object plane 122. The angle $\alpha_2$ of the second reflector plane 116 relative to the object plane 122 can advantageously improve the uniformity of illumination of the object plane 122. The angle $\alpha_2$ of the second reflector plane 116 relative to the object plane 122 can advantageously contribute to a reduction in glare off of the support plate 120 towards the image capture device 140.

The spacing of the second reflector plane 116 and the object plane 122 can advantageously improve the illumination of the object plane 122 by the second reflector plane 116. The second reflector plane 116 generally has a distal end 116a relative to the object plane 122, where "distal end" is intended to mean the end that is furthest from the object plane 122. The distal end 116a of the second reflector plane 116 can have a perpendicular distance $d_1$ of at least 102 mm to the object plane 122. The distal end 116a of the second reflector plane 116 can have a perpendicular distance $d_2$ of no more than 112 mm to the object plane 122. The distal end 116a of the second reflector plane 116 can have a perpendicular distance $d_2$ of 103.0 mm to 108.5 mm to the object plane 122. The distal end 116a of the second reflector plane 116 can have a perpendicular distance $d_2$ of 104.0 mm to 105.0 mm to the object plane 122. The distance $d_2$ between the distal end 116a of the second reflector plane 116 and the object plane 122 may be critical for the same reasons discussed above with respect to the perpendicular distance $d_1$ of the distal end 114a of the first reflector plane 114 to the object plane 122.

In various embodiments, the second reflector plane 116 is configured to reflect diffuse light within the cavity 112. The second reflector plane 116 can have a gloss of 81 to 88 at a 60° angle, in accordance with ASTM D 523-18 (2015). The second reflector plane 116 can have a gloss of 49 to 59 at a 20° angle, in accordance with ASTM D 523-18 (2015). The second reflector plane 116 can have a whiteness of greater than or equal to 75 in accordance with ASTM E313-15. In one example, the second panel 115 is coated a plurality of layers of Duxone®, Glossy White, by Axalta Coating Systems headquartered in Philadelphia, Pennsylvania. The second reflector plane 116 may be a spray coating.

In some embodiments the first reflector plane 114 and the second reflector plane 116 are symmetric relative to the support plate 120. Such a configuration may advantageously provide even illumination of the object plane 122. The distance between the first reflector plane 114 and the second reflector plane 116 may be critical in some implementations. If the first reflector plane 114 and the second reflector plane 116 are too far apart or too close, the illumination of the object plane 122 across the support plate 120 may be uneven. If the first reflector plane 114 and the second reflector plane 116 are too far apart, a central region of the support plate 120 may have less illumination than regions outside the central region. If the first reflector plane 114 and the second reflector plane 116 are too close, then the central region of the support plate 120 may be relatively bright from receiving reflected light from both reflector planes 114, 116 compared to outer regions of the support plate 120.

The distance between the first reflector plane 114 and the second reflector plane 116 may be characterized by the distance between their distal ends. In some embodiments, the distal end 114a of the first reflector plane 114 is at least 67.5 mm from the distal end 116a of the second reflector plane 116. In some embodiments, the distal end 114a of the first reflector plane 114 is no more than 70.5 mm from the distal end 116a of the second reflector plane 116. The distal end 114a of the first reflector plane 114 can be 68.0 mm to 70.0 mm from the distal end 116a of the second reflector plane 116. In some preferred examples, the distal end 114a of the first reflector plane 114 can be 68.5 mm to 69.5 mm from the distal end 116a of the second reflector plane 116.

In various embodiments, the cavity 112 of the housing 110 can be separated into an object receptacle 112(a) and an imaging cavity 112(b) by a barrier 118. The imaging cavity 112(b) can be configured to contain various imaging and processing components such as the image capture device 140 and the reflector planes 114, 116. In various embodiments the barrier 118 is generally transparent to facilitate imaging operations there-through. The barrier 118 can be mounted to the housing 110. The housing 110 and the barrier 118 are generally configured to isolate the imaging cavity 112(b) from the ambient environment. The barrier 118 and the housing 110 can isolate the contained imaging, illumination, and processing components to limit interference with those components during maintenance operations. The barrier 118 and the housing 110 can isolate the contained imaging, illumination, and processing components to limit interference with those components during insertion and removal objects for imaging in the object receptacle 112(a).

Figure 2:
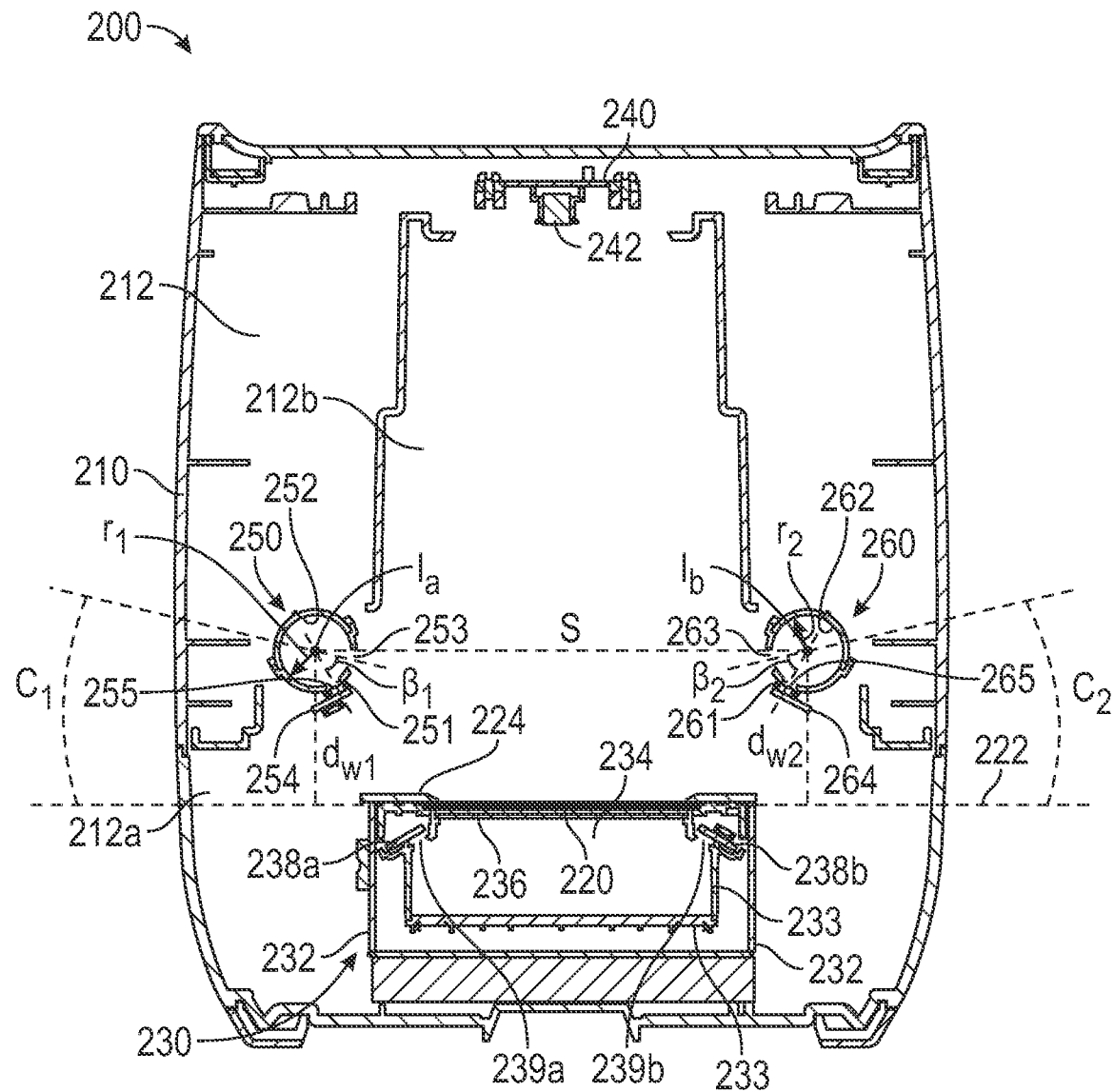
FIG. 2 is a schematic cross-sectional view of another example imaging device consistent with various embodiments.

FIG. 2 depicts a schematic cross-sectional view of another example imaging device 200, consistent with various embodiments. The imaging device 200 is generally configured to receive and scan an object. The imaging device 200 has a support plate 220 that is configured to receive an object for imaging by the imaging device 200. The support plate 220 can be consistent with the description of the support plate above with respect to FIG. 1.

The imaging device 200 has a housing 210 that defines a cavity 212. The support plate 220 is disposed in the cavity 212 of the housing 210. The surface of the support plate 220 that receives the object for imaging defines an object plane 222 that is configured to be scanned by the imaging device 200. The housing 210 generally surrounds the object plane 222 across the support plate 220. The housing 210 can be configured to isolate the object plane 222 of the support plate 220 from ambient light. The housing 210 can be configured to isolate the support plate 220 from the ambient environment. The support plate 220 can be isolated from the ambient environment to prevent dust and other debris from settling on the support plate 220.

In the current example, the object plane 222 is defined in a spacing region between the support plate 220 and a plate clamp 224. The plate clamp 224 is a frame that extends around a portion of the support plate 220. The plate clamp 224 is generally configured to secure a perimeter region of an object on the support plate 220. In various embodiments the plate clamp 224 defines a central opening that is configured to expose a central region of the object on the support plate 220 for imaging operations on the central region of the object. In some embodiments, the spacing region between the support plate 220 and the plate clamp 224 has a height that is configured to accommodate the thickness of a biological growth plate. In some embodiments, a transparent protector plate can be coupled to the plate clamp 224 and extend across the central opening of the plate clamp 224.

The imaging device 200 has an image capture device 240 that is configured to capture an image of the object plane 222 of the support plate 220. The image capture device 240 is positioned in the cavity of the housing 210. In various embodiments, the image capture device 240 is positioned vertically above the object plane 222 of the support plate 220. The image capture device 240 can be coupled to the housing 210. The image capture device 240 can be a camera, in various embodiments. The image capture device 240 can be a line or area scanner. The image capture device 240 can have an optical lens 242 that is positioned over the support plate 220. The optical lens 242 is generally configured to be in optical communication with the object plane 222 across the support plate 220. The object plane 222 of the support plate 220 is generally positioned to be the focal point of the optical lens 242. The distance between the optical lens and the object plane can be consistent with the description above associated with FIG. 1.

In various embodiments, the imaging device 200 has one or more light sources that are configured to illuminate the object plane 222 of the support plate 220 for imaging by the image capture device 240. In the current example, one such light source is a back illumination device 230. The back illumination device 230 is generally coupled to the housing 210. The back illumination device 230 has a back emitter face 236 that is generally configured to emit light. The back emitter face 236 is opposite the object plane 222 relative to the support plate 220. The object plane 222 is positioned between the back emitter face 236 and the optical lens 242 such that light is emitted from the back emitter face 236 through the object plane 222 towards the optical lens 242. The back emitter face 236 can have configurations consistent with the discussion above with respect to FIG. 1. The back emitter face 236 can be constructed of materials discussed above with respect to FIG. 1.

In examples, the back illumination device 230 has a shell 232 defining an illumination cavity 234. The back emitter face 236 is coupled to the shell 232. The back emitter face 236 extends across the illumination cavity 234. One or more light generation devices 238a, 238b are disposed in the illumination cavity 234 and, particularly, a first light generation device 238a and a second light generation device 238b. Each light generation device 238a, 238b is configured to emit light in the illumination cavity 234. In various embodiments, each light generation device 238a, 238b can be consistent with the types of light generation devices described above with respect to FIG. 1. In various embodiments, the light generation devices 238a, 238b are positioned in the illumination cavity 234 to avoid direct illumination of the back emitter face 236. In particular, the light generation devices 238a, 238b are configured such that the light reflects off at least one inner surface 233 of the back illumination device 230 before illuminating the back emitter face 236. The light can be transmitted through the back emitter face 236 towards the support plate 220.

In the current example, the imaging device 200 has additional light sources that are configured to illuminate the object plane 222 of the support plate 220 for imaging by the image capture device 240. In particular, the imaging device 200 has a waveguide 250 coupled to the housing 210. The waveguide 250 is generally configured to emit diffuse light towards the support plate 220. In some embodiments, the waveguide 250 is configured to generate light and diffuse the generated light. The waveguide 250 is generally configured to advantageously avoid the creation of glare on the support plate 220. The configuration of the waveguide 250 may advantageously maximize the strength of the diffuse light on the support plate 220 while limiting glare. In various embodiments the waveguide 250 is a first waveguide 250 and the imaging device 200 can have a second waveguide 260 and, potentially, additional waveguides.

Figure 3:
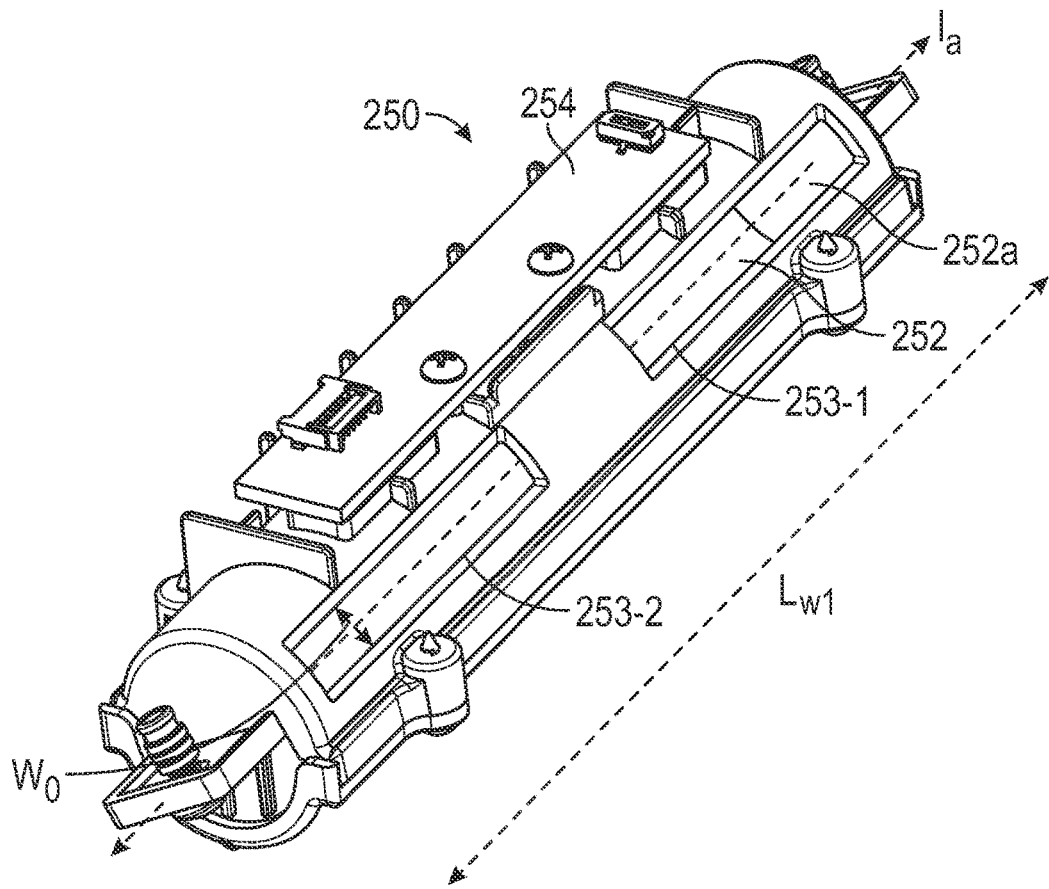
FIG. 3 is a perspective view of an example waveguide consistent with various embodiments.
Figure 4:
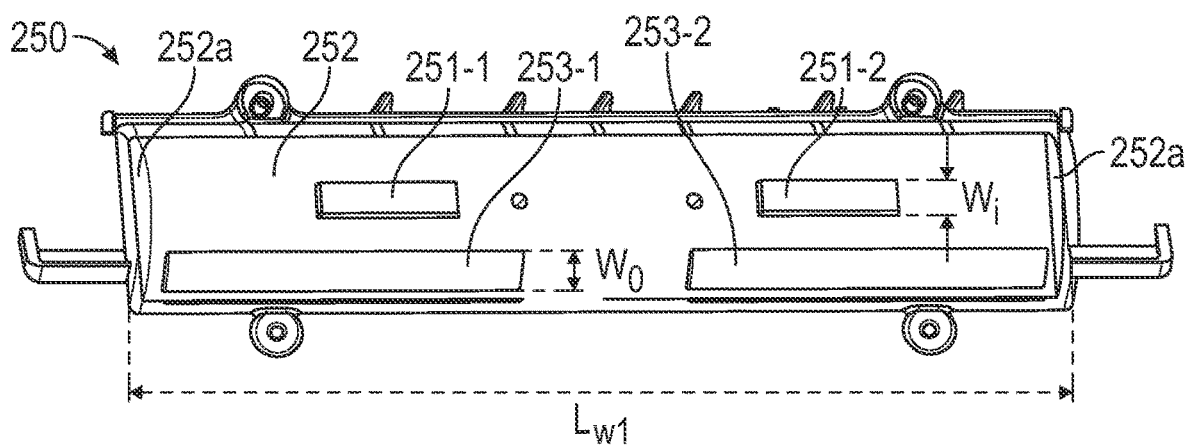
FIG. 4 is a perspective sectional view of a waveguide consistent with FIG. 3.
Figure 5:
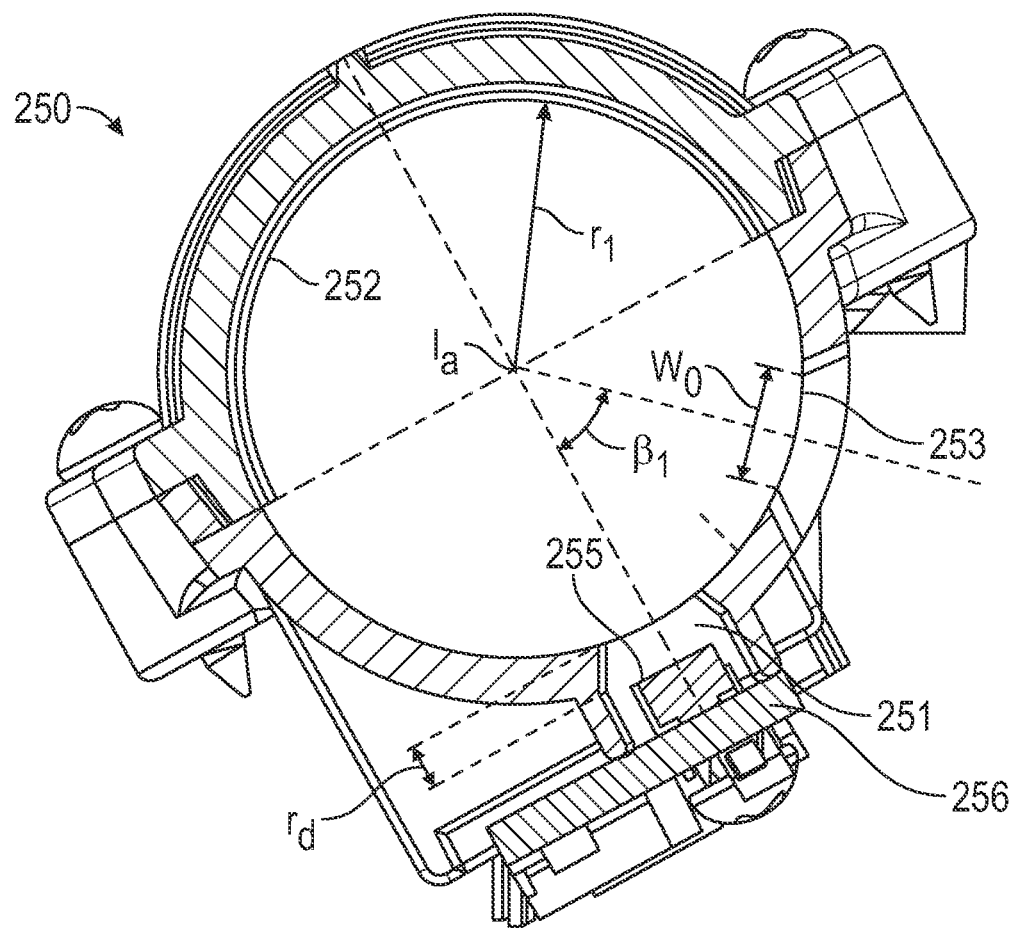
FIG. 5 is a cross-sectional view of the waveguide of FIG. 3.

FIG. 3 depicts a perspective view of an example waveguide consistent with FIG. 2, and FIG. 4 is a perspective sectional view of a portion of a waveguide consistent with FIG. 3. FIG. 5 is a cross-sectional view of the example waveguide of FIG. 3. FIGS. 3-5 can be viewed in conjunction with FIG. 2 for clarity. While the discussion of FIGS. 3-5 is explained in terms of the first waveguide 250, the discussion also applies to the second waveguide 260 unless noted herein or otherwise inconsistent with the current disclosure.

The first waveguide 250 has a first interior reflective surface 252. The first interior reflective surface 252 is symmetrical about a first central axis $l_a$. The first interior reflective surface 252 can extend in a longitudinal direction defined by the first central axis $l_a$. In the current example, the first interior reflective surface 252 has an inner cylindrical configuration about the first central axis $l_a$ extending in a longitudinal direction. As such, the first interior reflective surface 252 defines a circle in a cross-section perpendicular to the central axis $l_a$. In some embodiments, the first interior reflective surface has a cross-section perpendicular to the central axis defining an alternate shape, such as an oval, an octagon, or another geometric shape. In some embodiments, the first interior reflective surface can have an inner ovular cylindrical configuration. The first interior reflective surface 252 has a length L (FIGS. 3 and 4) extending in the longitudinal direction and a radius $r_1$ (FIG. 2) about the first central axis $l_a$.

The first waveguide 250 defines a first optical inlet 251 and a first optical outlet 253, each through the first interior reflective surface 252. The first waveguide 250 is configured to receive light through the first optical inlet 251. The first optical inlet 251 has a length extending in the longitudinal direction (FIGS. 3 and 4). The first optical inlet 251 has a width $W_i$ perpendicular to its length. The width $W_i$ is equal to the length of the chord across the opening in the first interior reflective surface 252 defining the first optical inlet 251. In various embodiments, the width $W_i$ remains constant along the length of the first optical inlet 251. In the current example, the first optical inlet 251 has two inlet segments, 251-1 and 251-2 (FIG. 4). The two inlet segments 251-1, 251-2 are radially aligned relative to the first central axis $l_a$. In some alternate examples, the first optical inlet 251 can be a single opening. In some examples, the first optical inlet 251 can be more than two openings.

The first waveguide 250 is configured to emit light through the first optical outlet 253. The first optical outlet 253 has a length extending in the longitudinal direction. The first optical outlet 253 has a width $W_O$ perpendicular to its length. The width $W_O$ is equal to the length of the chord across the opening in the first interior reflective surface 252 defining the first optical outlet 253. In various embodiments, the width $W_O$ remains constant along the length of the first optical outlet 253. In the current example, the first optical outlet 253 has two outlet segments, 253-1 and 253-2 (FIGS. 3 and 4). The two outlet segments 253-1, 253-2 are radially aligned relative to the first central axis $l_a$. In some alternate examples, the first optical outlet 253 can be a single opening. In some examples, the first optical outlet 253 can be more than two openings.

The first optical inlet 251 is radially spaced from the first optical outlet 253 relative to the first central axis $l_a$. The first optical inlet 251 is radially spaced from the first optical outlet 253 relative to the first central axis $l_a$ by a first angle $\beta_1$ (FIGS. 2 and 5). The angle of the first optical inlet 251 is determined based on the midpoint of the width $W_i$ of the first optical inlet 251 (see FIG. 2). The angle of the first optical outlet 253 is determined based on the midpoint of the width $W_O$ of the first optical outlet 253 (see FIG. 2). The first optical inlet 251 and the first optical outlet 253 are generally radially spaced such that light emitted through the first optical inlet 251 generally reflects off of the first interior reflective surface 252 one or more times before being emitted through the first optical outlet 253. In various embodiments, the first angle $\beta_1$ defined between the first optical inlet 251 and the first optical outlet 253 is an acute angle. In some embodiments, the first angle $\beta_1$ defined between first optical inlet 251 and the first optical outlet 253 is less than 60 degrees.

A first outlet angle $c_1$ between the first optical outlet 253 and the object plane 222 (FIG. 2) may advantageously increase the uniformity of the illumination of at least a portion of the object plane 222 across the support plate 220. It has been discovered that the first outlet angle $c_1$ between the first optical outlet 253 and the object plane 222 may be critical to some implementations of the current technology. In particular, the first outlet angle $c_1$ between the first optical outlet 253 and the object plane 222 can dictate the quality of the illumination of the object plane 222 across the support plate 220. If the first outlet angle $c_1$ between the first optical outlet 253 and the object plane 222 is too large or too small, the illumination of the object plane 222 across the support plate 220 may be uneven or the quality of light may be undesirable. If the first outlet angle $c_1$ is too small, the first optical outlet 253 may reflect less light on a central region of the support plate 220 than a region outside the central region, such as a first edge region of the support plate 220. If the first outlet angle $c_1$ is too large, the first optical outlet 253 may reflect more light on the central region of the support plate 220 than the first edge region of the support plate 220. Additionally, if the first outlet angle $c_1$ is too large, the intensity of the light on the support plate 220 may be too severe and may create shadows and highlight imperfections of the object in the object plane 222, which may negatively impact the ability of the system to conduct imaging operations.

In various embodiments, the first optical outlet 253 is at an angle $c_1$ of at least 11.5° from the object plane 222, either in a clockwise or counterclockwise direction. In various embodiments, the first optical outlet 253 is at an angle $c_1$ of no more than 14.5° from the object plane 222. In some embodiments, the first optical outlet 253 is at an angle $c_1$ of 12° to 14° from the object plane 222. In some embodiments, the first optical outlet 253 is at an angle $c_1$ of 12.5° to 13.5° from the object plane 222.

In various embodiments, the distance $d_{w1}$ (FIG. 2) between the first waveguide 250 and the object plane 222 may advantageously increase the uniformity of the illumination of at least a portion of the object plane 222 across the support plate 220. The distance $d_{w1}$ may be critical to some implementations to ensure even illumination of the object plane 222 across the support plate 220. If the distance $d_{w1}$ is too large, portions of the object plane 222, such as a central region of the support plate 220 may not receive enough light. If the distance $d_{w1}$ is too small, portions of the support plate 220 may receive too much light. The distance $d_{w1}$ between the first waveguide 250 and the object plane 222 can generally be determined from the first central axis $l_a$ of the first waveguide 250 in a direction perpendicular to the object plane 222. In various embodiments, the distance $d_{w1}$ between the first central axis $l_a$ of the first waveguide 250 and the object plane 222 is at least 42.0 mm. In various embodiments, the distance $d_{w1}$ between the first central axis $l_a$ of the first waveguide 250 and the object plane 222 is no more than 45.0 mm. In some embodiments, the distance $d_{w1}$ between the first central axis $l_a$ of the first waveguide 250 and the object plane 222 is 42.5 mm to 44.5 mm. In some embodiments, the distance $d_{w1}$ between the first central axis $l_a$ of the first waveguide 250 and the object plane 222 is 43.0 mm to 44.0 mm.

The first interior reflective surface 252 is generally configured to reflect light therein. The first interior reflective surface 252 is generally a radial surface about the first central axis $l_a$ having a length $L_{w1}$ (FIGS. 3 and 4). The first interior reflective surface 252 can have an end surface 252-1 extending across each end of the radial surface. In various embodiments, the length $L_{w1}$ of the first interior reflective surface 252 is at least 100 mm. In various embodiments, the length $L_{w1}$ of the first interior reflective surface 252 is no more than 120 mm. In some embodiments, the length $L_{w1}$ of the first interior reflective surface 252 is at least 104 mm.

The first interior reflective surface 252 can be configured to diffuse, or scatter, light received through the first optical inlet 251. Such a configuration may advantageously optimize the uniformity of the light emitted through the first optical outlet 253. In some embodiments, the first interior reflective surface 252 is defined by a coating on the inner surface of the first waveguide 250. The coating can generally be configured to minimize glare. The first interior reflective surface 252 has a gloss of at least 1, where gloss is determined at a 600 angle in accordance with ASTM D 523-18. In various embodiments, the first interior reflective surface 252 has a gloss of no more than 8 at a 60° angle. In various embodiments, the first interior reflective surface 252 has a gloss of 3 to 5. The first interior reflective surface 252 can have a whiteness of greater than or equal to 75 in accordance with ASTM E313-15.

In examples, the first interior reflective surface 252 is coated with a low gloss urethane enamel and catalyst that is sprayed on the first interior reflective surface 252. As a specific example, three parts of #AUE-100LG of PPG Industries of Southfield, Michigan, is mixed with catalyst #AUE-101 (also by PPG Industries) and paint thinner. The mixture is spray-coated onto the first interior reflective surface 252 in 3 to 4 layers. Each layer has a cure time ranging from 10 to 15 minutes between applications. The coating has a total thickness ranging from 140 to 200 μm.

Returning to the discussion of FIGS. 2-5, a first light source 254 is coupled to the first waveguide 250. The first light source 254 is generally configured to emit light through the first optical inlet 251 of the first waveguide 250. The first light source 254 is coupled to the first waveguide 250 about the first optical inlet 251. The first light source 254 can be consistent with the types of light generation devices described above with respect to FIG. 1. The first light source 254 defines a first source emitter face 255. The first source emitter face 255 is the face of the first light source 254 from which light is emitted. In various embodiments, the first source emitter face 255 is parallel to the first optical inlet 251, meaning that the plane defined by the length and the width $W_i$ of the first optical inlet 251 is parallel to the plane defined by the first source emitter face 255.

In various embodiments, the position of the first source emitter face 255 relative to the first interior reflective surface 252 may advantageously reduce shadows and glare to optimize uniformity of the light emitted from the first optical outlet 253. The first source emitter face 255 is generally radially outward from the first interior reflective surface 252 relative to the first central axis $l_a$ (FIG. 5). A distance $r_d$ between the first source emitter face 255 and the first interior reflective surface 252 may be critical in some implementations to achieve desirable illumination of the support plate 220 across the object plane 222 for imaging. If the distance $r_d$ is too small, the intensity of the light on the support plate 220 may be too high, resulting in the creation of shadows and highlighting imperfections of the object in the object plane 222, which may negatively impact the ability of the system to conduct imaging operations. If the distance $r_d$ is too high, the support plate 220 might not be effectively illuminated to conduct imaging operations.

In various embodiments, the first source emitter face 255 is radially outward from the first interior reflective surface 252 by distance $r_d$ of at least 1.2 mm. In various embodiments, the first source emitter face 255 is radially outward from the first interior reflective surface 252 by a radial distance $r_d$ of no more than 2.2 mm. The first source emitter face 255 can be radially outward from the first interior reflective surface 252 by a radial distance $r_d$ of 1.3 mm to 2.1 mm. In some examples, the first source emitter face 255 is radially outward from the first interior reflective surface 252 by a radial distance $r_d$ of 1.4 mm to 2.0 mm.

While the discussion of FIGS. 3-5 is explained in terms of the first waveguide 250, the discussion also applies to the second waveguide 260. The second waveguide 260 has a second interior reflective surface 262. The second interior reflective surface 262 is symmetrical about a second central axis $l_b$. The second interior reflective surface 262 can extend in a longitudinal direction defined by the second central axis $l_b$. In the current example, the second interior reflective surface 262 has an inner cylindrical configuration about the second central axis $l_b$ extending in a longitudinal direction. As such, the second interior reflective surface 262 defines a circle in a cross-section perpendicular to the central axis $l_b$. In some embodiments, the second interior reflective surface has a cross-section perpendicular to the central axis defining an alternate shape, such as an oval, an octagon, or another geometric shape. In some embodiments, the second interior reflective surface can have an inner ovular cylindrical configuration. The second interior reflective surface 262 has a length extending in the longitudinal direction and a radius $r_2$ (FIG. 2) about the second central axis $l_b$.

The second waveguide 260 defines a second optical inlet 261 and a second optical outlet 263, each through the second interior reflective surface 262. The second waveguide 260 is configured to receive light through the second optical inlet 261. The second optical inlet 261 has a length extending in the longitudinal direction (as discussed in reference to FIGS. 3 and 4 for the first waveguide 250). The second optical inlet 261 has a width perpendicular to its length. Similar to the first optical inlet 251, the width is equal to the length of the chord across the opening in the second interior reflective surface 262 defining the second optical inlet 261. In various embodiments, the width remains constant along the length of the second optical inlet 261. The second optical inlet 261 can have two inlet segments. The two inlet segments can be radially aligned relative to the second central axis $l_b$. In some alternate examples, the second optical inlet 261 can be a single opening. In some examples, the second optical inlet 261 can be more than two openings.

The second waveguide 260 is configured to emit light through the second optical outlet 263. The second optical outlet 263 has a length extending in the longitudinal direction. The second optical outlet 263 has a width perpendicular to its length. The width is equal to the length of the chord across the opening in the second interior reflective surface 262 defining the second optical outlet 263. In various embodiments, the width remains constant along the length of the second optical outlet 263. In some examples, the second optical outlet 263 has two outlet segments. The two outlet segments can be radially aligned relative to the second central axis $l_b$. In some examples, the second optical outlet 263 can be a single opening. In some examples, the second optical outlet 263 can be more than two openings.

The second optical inlet 261 is radially spaced from the second optical outlet 263 relative to the second central axis $l_b$. The second optical inlet 261 is radially spaced from the second optical outlet 263 relative to the second central axis $l_b$ by a second angle $\beta_2$ (FIG. 2). The angle of the second optical inlet 261 is determined based on the midpoint of the width of the second optical inlet 261, similar to the angle of the first optical inlet 251, discussed above. The angle of the second optical outlet 263 is determined based on the midpoint of the width of the second optical outlet 263. The second optical inlet 261 and the second optical outlet 263 are generally radially spaced such that light emitted through the second optical inlet 261 generally reflects off of the second interior reflective surface 262 one or more times before being emitted through the second optical outlet 263. In various embodiments, the second angle $\beta_2$ defined between the second optical inlet 261 and the second optical outlet 263 is an acute angle. In some embodiments, the second angle $\beta_2$ defined between second optical inlet 261 and the second optical outlet 263 is less than 60 degrees.

A second outlet angle $c_2$ of the second optical outlet 263 relative to the object plane 222 may be critical in some implementations for the same reasons described above relative to the first outlet angle $c_1$ of the first optical outlet 253 relative to the object plane 222. A second outlet angle $c_2$ between the second optical outlet 263 and the object plane 222 (FIG. 2) may advantageously increase the uniformity of the illumination of at least a portion of the object plane 222 across the support plate 220. In some embodiments, the angle $c_2$ between the second optical outlet 263 and the object plane 222 is the opposite of the angle $c_1$ between the first optical outlet 253 and the object plane 222. In various embodiments, the second optical outlet 263 is at an angle $c_2$ of at least 11.50 from the object plane 222. In various embodiments, the second optical outlet 263 is at an angle $c_2$ of no more than 14.5° from the object plane 222. In some embodiments, the second optical outlet 263 is at an angle $c_2$ of 12° to 14° from the object plane 222. In some embodiments, the second optical outlet 263 is at an angle $c_2$ of 12.5° to 13.5° from the object plane 222. The angle $c_2$ can be in a clockwise or counterclockwise direction.

In various embodiments, the distance $d_{w2}$ between the second waveguide 260 and the object plane 222 may advantageously increase the uniformity of the illumination of at least a portion of the object plane 222 across the support plate 220. In some implementations, the distance $d_{w2}$ may be critical for the same reasons discussed above with respect to the distance $d_{w1}$ between the first waveguide 250 and the object plane 222. The distance $d_{w2}$ between the second waveguide 260 and the object plane 222 can generally be determined from the second central axis $l_b$ of the second waveguide 260 in a direction perpendicular to the object plane 222. In various embodiments, the distance $d_{w2}$ between the second central axis $l_b$ of the second waveguide 260 and the object plane 222 is at least 42.0 mm. In various embodiments, the distance $d_{w2}$ between the second central axis $l_b$ of the second waveguide 260 and the object plane 222 is no more than 45.0 mm. In some embodiments, the distance $d_{w2}$ between the second central axis $l_b$ of the second waveguide 260 and the object plane 222 is 42.5 mm to 44.5 mm. In some embodiments, the distance $d_{w2}$ between the second central axis $l_b$ of the second waveguide 260 and the object plane 222 is 43.0 mm to 44.0 mm.

The second interior reflective surface 262 is generally configured to reflect light therein. The second interior reflective surface 262 is generally a radial surface about the second central axis $1_b$ having a length. The second interior reflective surface 262 can have an end surface extending across each end of the radial surface. In various embodiments, the length of the second interior reflective surface 262 is equal to the length $L_{w1}$ of the first interior reflective surface 252.

The second interior reflective surface 262 can be configured to diffuse, or scatter, light received through the second optical inlet 261. Such a configuration may advantageously optimize the uniformity of the light emitted through the second optical outlet 263. In some embodiments, the second interior reflective surface 262 is defined by a coating on the inner surface of the second waveguide 260. The coating can generally be configured to minimize glare. The second interior reflective surface 262 has a gloss of at least 1, where gloss is determined at a 60° angle in accordance with ASTM D 523-18. In various embodiments, the second interior reflective surface 262 has a gloss of no more than 8 at a 60° angle. In various embodiments, the second interior reflective surface 262 has a gloss of 3 to 5. The second interior reflective surface 262 can have a whiteness of greater than or equal to 75 in accordance with ASTM E313-15.

In examples, the second interior reflective surface 262 is coated with a low gloss urethane enamel and catalyst that is sprayed on the second interior reflective surface 262. As a specific example, three parts of #AUE-100LG of PPG Industries of Southfield, Michigan, is mixed with catalyst #AUE-101 (also by PPG Industries) and paint thinner. The mixture is spray-coated onto the second interior reflective surface 262 in 3 to 4 layers. Each layer has a cure time ranging from 10 to 15 minutes between applications. The coating has a total thickness ranging from 140 to 200 μm.

A second light source 264 is coupled to the second waveguide 260. The second light source 264 is generally configured to emit light through the second optical inlet 261 of the second waveguide 260. The second light source 264 is coupled to the second waveguide 260 about the second optical inlet 261. The second light source 264 can be consistent with the types of light generation devices described above with respect to FIG. 1. The second light source 264 defines a second source emitter face 265. The second source emitter face 265 is the face of the second light source 264 from which light is emitted. In various embodiments, the second source emitter face 265 is parallel to the second optical inlet 261, meaning that the plane defined by the length and the width of the second optical inlet 261 is parallel to the plane defined by the second source emitter face 265.

In various embodiments, the position of the second source emitter face 265 relative to the second interior reflective surface 262 may advantageously reduce shadows and glare to optimize uniformity of the light emitted from the second optical outlet 263. The second source emitter face 265 is generally radially outward from the second interior reflective surface 262 relative to the second central axis $1_b$ as discussed above with reference to the first waveguide 250 with respect to FIG. 5. In various embodiments, the second source emitter face 265 is radially outward from the second interior reflective surface 262 by distance of at least 1.2 mm. In various embodiments, the second source emitter face 265 is radially outward from the second interior reflective surface 262 by a radial distance of no more than 2.2 mm. The second source emitter face 265 can be radially outward from the second interior reflective surface 262 by a radial distance of 1.3 mm to 2.1 mm. In some examples, the second source emitter face 265 is radially outward from the second interior reflective surface 262 by a radial distance of 1.4 mm to 2.0 mm. In some implementations, such a distance may be critical for the same reasons discussed above with respect to the radial distance between first source emitter face 255 and the first interior reflective surface 252.

In various embodiments, the first waveguide 250 and the second waveguide 260 are symmetrical across the support plate 220. Such a configuration may advantageously optimize the uniformity of the light across the support plate 220. The distance s (FIG. 2) between the first waveguide 250 and the second waveguide 260 may be optimized to advantageously increase the uniformity of the light across the support plate 220. The distance between the first waveguide 250 and the second waveguide 260 may be critical in some implementations. If the first waveguide 250 and the second waveguide 260 are too far apart or too close, the illumination of the object plane 222 across the support plate 220 may be uneven. If the first waveguide 250 and the second waveguide 260 are too far apart, a central region of the support plate 220 may have less illumination than regions outside the central region. If the first waveguide 250 and the second waveguide 260 are too close, then the central region of the support plate 220 may be relatively bright from receiving reflected light from both waveguides 250, 260 compared to outer regions of the support plate 220.

The distance s between the first waveguide 250 and the second waveguide 260 may be measured from the first central axis $1_a$ of the first waveguide 250 to the second central axis $1_b$ of the second waveguide 260. The distance s between the first waveguide 250 and the second waveguide 260 is generally at least 134.5 mm. The distance s between the first waveguide 250 and the second waveguide 260 is generally no more than 139.3 mm. In some embodiments, the distance s between the first waveguide 250 and the second waveguide 260 is 135.5 mm to 138.0 mm. In some embodiments, the distance s between the first waveguide 250 and the second waveguide 260 is 136.8 mm to 137.2 mm.

Figure 6:
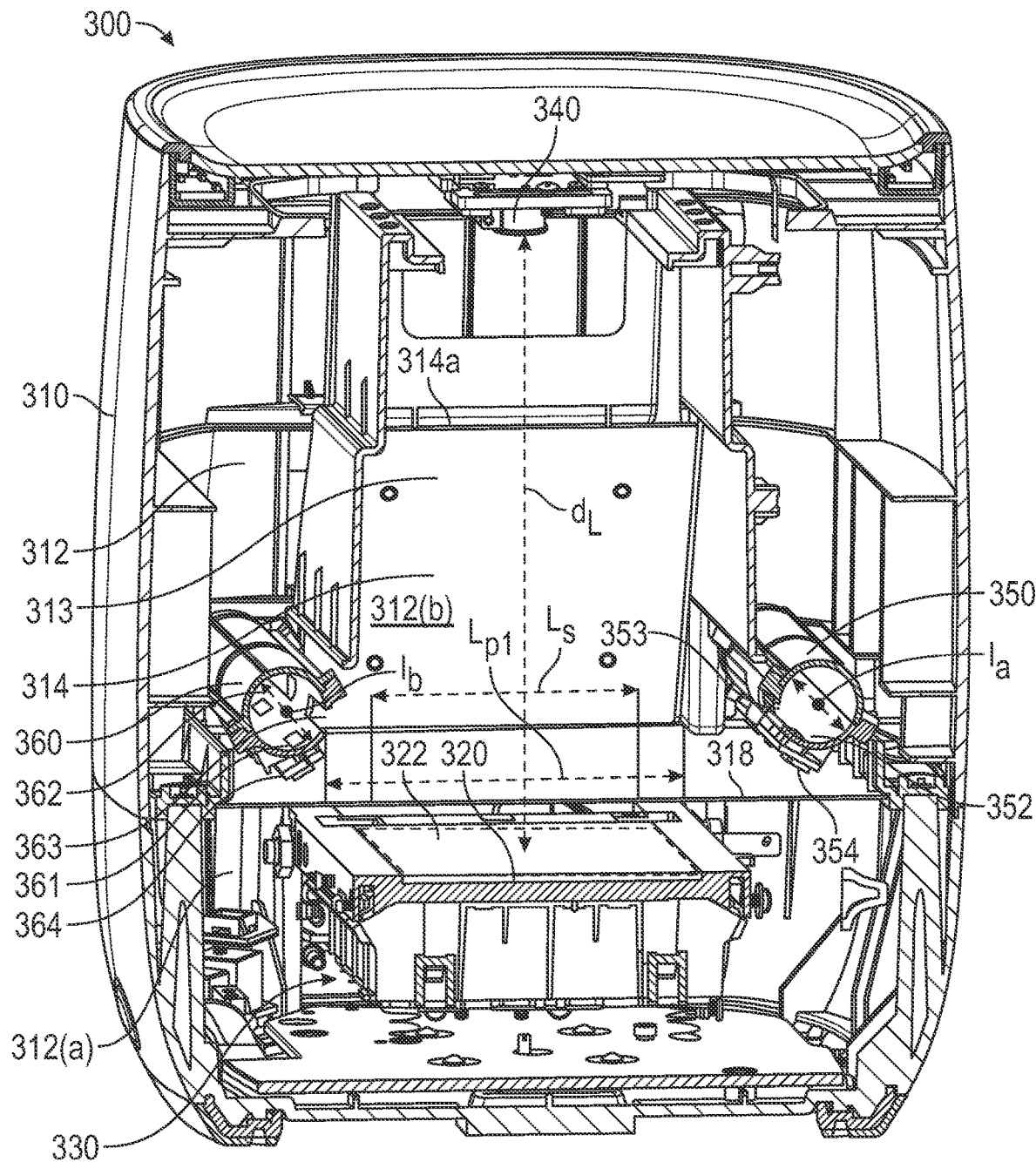
FIG. 6 is a perspective cross-sectional view of an example implementation of the current technology.
Figure 7:
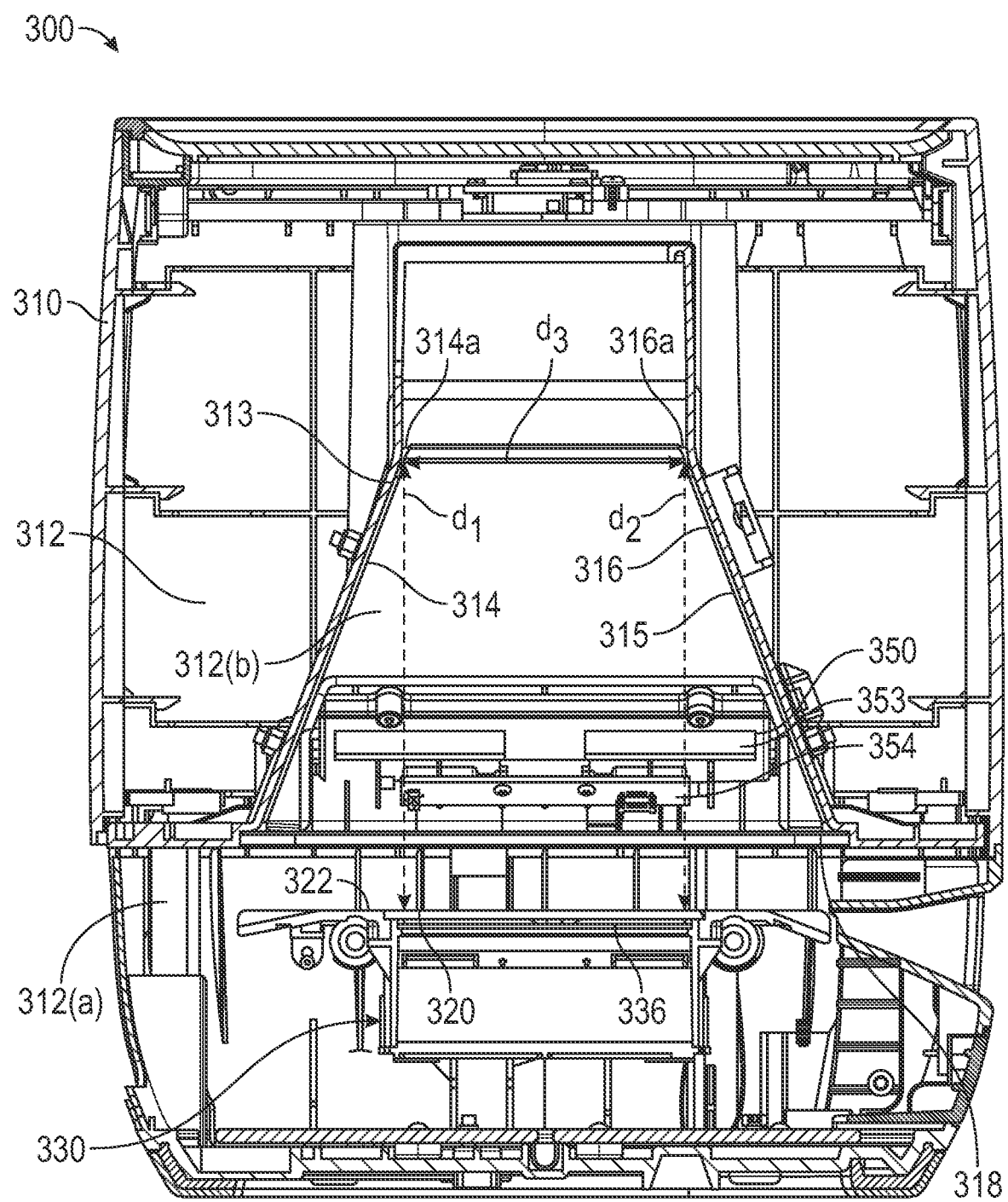
FIG. 7 is a cross-sectional view of the example implementation of FIG. 6, through a second cross section.

In various implementations of the currently described technology reflectors, such as described above with respect to FIG. 1, and waveguides, such as described above with respect to FIGS. 2-5, can be used together in an imaging device. FIG. 6 depicts a simplified cross-sectional perspective view of an example imaging device 300 consistent with various implementations, and FIG. 7 depicts cross-sectional view of the example imaging device 300 through a second cross-section. The imaging device 300 can be configured to scan images. In an example, the imaging device 300 is configured to receive a biological growth plate.

The imaging device 300 has a housing 310 that defines a cavity 312. A support plate 320 is disposed in the cavity 312 of the housing 310. A surface of the support plate 320 is configured to receives an object for imaging, such as a biological growth plate. The object is configured to be positioned in an object plane 322 defined by the support plate 320, which is configured to be scanned by the imaging device 300. The housing 310 generally surrounds the object plane 322 across the support plate 320. The support plate 320 can be isolated from the ambient environment to prevent dust and other debris from settling on the support plate 320, consistent with discussions above.

The imaging device 300 has an image capture device 340 (FIG. 6) that is configured to capture an image of the object plane 322 of the support plate 320. The image capture device 340 is positioned in the cavity of the housing 310. In various embodiments, the image capture device 340 is positioned vertically above the object plane 322 of the support plate 320. The image capture device 340 can be coupled to the housing 310. The image capture device 340 can be a camera, in various embodiments. The image capture device 340 can be a line or area scanner. The image capture device 340 can have an optical lens (not currently visible) that is positioned over the support plate 320. The optical lens is generally configured to be in optical communication with the object plane 322 across the support plate 320. A distance $d_L$ can be defined between the optical lens and the object plane 322 consistent with the discussion above associated with FIG. 1.

The imaging device 300 has one or more light sources that are configured to illuminate the object plane 322 of the support plate 320 for imaging by the image capture device 340. The lights sources are configured to advantageously provide an even, diffuse light on the object plane 322 across the support plate 320. A first light source is a back illumination device 330. The back illumination device 330 is generally coupled to the housing 310. The back illumination device 330 has a back emitter face 336 (FIG. 7) that is configured to emit light. The back emitter face 336 is opposite the object plane 322 relative to the support plate 320. The object plane 322 is positioned between the back emitter face 336 and the optical lens 342 such that light is emitted from the back emitter face 336 through the object plane 322 towards the optical lens 342. The back illumination device 330 can be consistent with back illumination devices discussed above with reference to FIGS. 1 and 2.

In the current example, the imaging device 300 has additional light sources that are configured to illuminate the object plane 322 of the support plate 320 for imaging by the image capture device 340. In particular, the imaging device 300 has a first waveguide 350 and a second waveguide 360. Each of the first waveguide 350 and the second waveguide 360 are coupled to the housing 310. The waveguides 350, 360 are configured to emit diffuse light towards the support plate 320.

The first waveguide 350 has a first interior reflective surface 352. The first interior reflective surface 352 generally has an inner cylindrical configuration about a first central axis $1_a$ extending in the longitudinal direction. The first waveguide 350 defines a first optical inlet 351 and a first optical outlet 353, each through the first interior reflective surface 352. The first optical inlet 351 and the first optical outlet 353 are generally radially spaced such that light emitted through the first optical inlet 351 generally reflects off of the first interior reflective surface 352 before being emitted through the first optical outlet 353. The first interior reflective surface 352 is generally configured to reflect light therein. A first light source 354 is coupled to the first waveguide 350 that is configured to emit light through the first optical inlet 351. In particular, the first light source 354 is coupled to the first waveguide 350 about the first optical inlet 351. The first light source 354 defines a first source emitter face, which is not currently visible. The first waveguide 350 and the first light source 354 have configurations consistent with the discussion above with respect to FIGS. 2-5.

The second waveguide 360 has a second interior reflective surface 362. The second interior reflective surface 362 is symmetrical about a second central axis $1_b$. The second interior reflective surface 362 can extend in a longitudinal direction defined by the second central axis $1_b$. The second interior reflective surface 362 can have an inner cylindrical configuration about a second central axis $1_b$. However, the second interior reflective surface 362 can have define other shapes about a second central axis $1_b$, as discussed above with respect to the first interior reflective surface 252. The second waveguide 360 defines a second optical inlet 361 and a second optical outlet 363, each through the second interior reflective surface 362. The second optical inlet 361 and the second optical outlet 363 are generally radially spaced such that light emitted through the second optical inlet 361 generally reflects off of the second interior reflective surface 362 before being emitted through the second optical outlet 363. The second interior reflective surface 362 is generally configured to reflect light therein. A second light source 364 is coupled to the second waveguide 360 that is configured to emit light through the second optical inlet 361. In particular, the second light source 364 is coupled to the second waveguide 360 about the second optical inlet 361. The second light source 364 defines a second source emitter face, which is not currently visible. The second waveguide 360 and the second light source 364 have configurations consistent with the discussion above with respect to FIGS. 2-5.

The first waveguide 350 and the second waveguide 360 are generally symmetric relative to the support plate 320. The first waveguide 350 and the second waveguide 360 can be positioned relative to each other and the support plate 320 consistently with the discussions above with respect to FIGS. 2-5.

The imaging device 300 has a first reflector plane 314 and a second reflector plane 316 within the housing 310. Each of the first reflector plane 314 and the second reflector plane 316 is configured to be in reflective communication with the object plane 322. The first reflector plane 314 and the second reflector plane 316 are configured to reflect light generated by the back illumination device 330, the first waveguide 350 and the second waveguide 360 towards the object plane 322. The first reflector plane 314 and the second reflector plane 316 are generally symmetric relative to the support plate 320.

As is visible in FIG. 6, the first reflector plane 314 has a length $L_{P1}$ that is parallel to the object plane 322 of the support plate 320. In various embodiments, the first reflector length $L_{P1}$ is greater than a corresponding length $L_S$ of the support plate 320, where the "corresponding length" is defined as the dimension parallel to the referenced length. In some implementations, the first reflector length $L_{P1}$ may be critical to proper illumination of the support plate 320 across the object plane 322. If the first reflector length $L_{P1}$ is too short, then portions of the support plate 320 may not be illuminated by the first reflector plane 314, impeding even illumination of the support plate 320 for imaging operations. In various embodiments, the first reflector length $L_{P1}$ is at least 50 mm. In various embodiments, the length of the first reflector is not particularly limited. However, in some embodiments, the first reflector length $L_{P1}$ is no more than 200 mm. The first reflector length $L_{P1}$ can be at least 94.5 mm. In some embodiments, the first reflector length $L_{P1}$ is 96.5 mm to 97.5 mm. While not visible in the current figures, the second reflector plane 316 similarly has a second reflector length that may be critical to some implementations of the present technology. The second reflector length is generally consistent with the discussion of the first reflector length $L_{P1}$, above.

The first reflector plane 314 is defined by a first panel 313 and the second reflector plane 316 is defined by a second panel 315. The first reflector plane 314 has a first distal end 314a relative to the support plate 320. The second reflector plane 316 has a second distal end 316a relative to the support plate 320. The first reflector plane 314 and the second reflector plane 316 can have configurations consistent with the discussion above with respect to FIG. 1.

In the current example, the cavity 312 of the housing 310 can be separated into an object receptacle 312(a) and an imaging cavity 312(b) by a barrier 318. The imaging cavity 312(b) can be configured to contain various imaging and processing components such as the image capture device 340, the reflector planes 314, 316, and the waveguides 350, 360. The barrier 318 is generally transparent to facilitate imaging operations there-through, including illumination and image capturing of the object plane 322. In various embodiments, the barrier 318 is non-reflective. The housing 310 and the barrier 318 are generally configured to isolate the imaging cavity 312(b) from the ambient environment. The barrier 318 and the housing 310 can isolate the contained imaging, illumination, and processing components to limit interference with those components during maintenance operations. The barrier 318 and the housing 310 can isolate the contained imaging, illumination, and processing components to limit interference with those components during insertion and removal objects for imaging in the object receptacle 312(a).

Exemplary Embodiments

Embodiment 1. An imaging device comprising:
a support plate defining an object plane;
a housing surrounding the object plane across the support plate;
a first reflector plane within the housing, wherein the first reflector plane is 68.0° to 70.0° from the object plane, wherein the first reflector plane is in reflective communication with the object plane; and
a second reflector plane within the housing, wherein the second reflector plane is 68.0° to 70.0° from the object plane, wherein the second reflector plane is in reflective communication with the object plane.

Embodiment 2. The imaging device of any one of embodiments 1 and 3-17, wherein each of the first reflector plane and the second reflector plane each have a distal end relative to the object plane, and the distal end of the first reflector plane is 67.5 mm to 70.5 mm from the distal end of the second reflector plane.

Embodiment 3. The imaging device of any one of embodiments 1-2 and 4-17, wherein a distance between a distal end of the first reflector plane and the object plane is 102.0 mm to 112.0 mm.

Embodiment 4. The imaging device of any one of embodiments 1-3 and 5-17, further comprising an image capture device coupled to the housing, the image capture device having an optical lens, wherein a distance between the optical lens and the object plane is 166 mm to 178.0 mm.

Embodiment 5. The imaging device of any one of embodiments 1-4 and 6-17, wherein the first reflector plane has a length of at least 94.5 in a direction parallel to the object plane.

Embodiment 6. The imaging device of any one of embodiments 1-5 and 7-17, further comprising a back illumination device coupled to the housing, wherein the back illumination device comprises a back emitter face opposite the object plane relative to the support plate, wherein the back emitter face is 1.5 mm to 4.5 mm from the object plane, and the back emitter face is configured to transmit diffuse light through the object plane.

Embodiment 7. The imaging device of any one of embodiments 1-6 and 8-17, wherein the first reflector plane and second reflector plane each have a gloss of 81-88 at a 600 angle, in accordance with ASTM D 523-18.

Embodiment 8. The imaging device of any one of embodiments 1-7 and 9-17, further comprising a first waveguide coupled to the housing, wherein the first waveguide comprises a first interior reflective surface, and the first waveguide defines a first optical inlet through the first interior reflective surface and a first optical outlet through the first interior reflective surface.

Embodiment 9. The imaging device of any one of embodiments 1-8 and 10-17, wherein the first optical outlet is 11.5° to 14.5° from the object plane.

Embodiment 10. The imaging device of any one of embodiments 1-9 and 11-17, further comprising a first light source coupled to the first waveguide about the first optical inlet, wherein the first light source defines a first source emitter face that is radially outward from the first interior reflective surface relative to the first central axis.

Embodiment 11. The imaging device of any one of embodiments 1-10 and 12-17, wherein the first source emitter face is 1.2 mm to 2.2 mm radially outward from the first interior reflective surface relative to the first central axis.

Embodiment 12. The imaging device of any one of embodiments 1-11 and 13-17, further comprising a second waveguide coupled to the housing, wherein the second waveguide comprises a second interior reflective surface, and the second waveguide defines a second optical inlet through the second interior reflective surface and a second optical outlet through the second interior reflective surface Embodiment 13. The imaging device of any one of embodiments 1-12 and 14-17, wherein the second optical outlet is 11.5° to 14.5° from the object plane.

Embodiment 14. The imaging device of any one of embodiments 1-13 and 15-17, further comprising a second light source coupled to the second waveguide about the second optical outlet, wherein the second light source defines a second source emitter face that is radially outward from the second interior reflective surface relative to the second central axis.

Embodiment 15. The imaging device of any one of embodiments 1-14 and 16-17, wherein the second source emitter face is 1.2 mm to 2.2 mm radially outward from the second interior reflective surface relative to the second central axis.

Embodiment 16. The imaging device of any one of embodiments 1-15 and 17, wherein the first waveguide defines a first central axis that is 134.5 mm to 139.3 mm from a second central axis defined by the second waveguide.

Embodiment 17. The imaging device of any one of embodiments 1-16, wherein a distance between the object plane and a first central axis defined by the first waveguide is 42.0 mm to 45.0 mm.

Embodiment 18. An imaging device comprising:
a support plate defining an object plane;
a housing surrounding the object plane across the support plate;
a first waveguide coupled to the housing, wherein the first waveguide comprises a first interior reflective surface, and the first waveguide defines a first optical inlet through the first interior reflective surface and a first optical outlet through the first interior reflective surface, wherein the first optical outlet is 11.5° to 14.5° from the object plane; and
a second waveguide coupled to the housing, wherein the second waveguide comprises a second interior reflective surface, and the second waveguide defines a second optical inlet through the second interior reflective surface and a second optical outlet through the second interior reflective surface, wherein the second optical outlet is 11.5° to 14.5° from the object plane.

Embodiment 19. The imaging device of any one of embodiments 18 and 20-29, wherein the first waveguide defines a first central axis that is 134.5 mm to 139.3 mm from a second central axis defined by the second waveguide.

Embodiment 20. The imaging device of any one of embodiments 18-19 and 21-29, wherein a distance between the object plane and a central axis defined by the first waveguide is 42.0 mm to 45.0 mm.

Embodiment 21. The imaging device of any one of embodiments 18-20 and 22-29, further comprising a first light source coupled to the first waveguide about the first optical inlet, wherein the first light source defines a first source emitter face that is radially outward from the first interior reflective surface relative to the first central axis.

Embodiment 22. The imaging device of any one of embodiments 18-21 and 23-29, wherein the first source emitter face is 1.2 mm to 2.2 mm radially outward from the first interior reflective surface relative to the first central axis.

Embodiment 23. The imaging device of any one of embodiments 18-22 and 24-29, further comprising a second light source coupled to the second waveguide about the second optical outlet, wherein the second light source defines a second source emitter face that is radially outward from the second interior reflective surface relative to the second central axis.

Embodiment 24. The imaging device of any one of embodiments 18-23 and 25-29, further comprising:
 a first reflector plane coupled to the housing, wherein the first reflector plane is 68.0° to 70.0° from the object plane, wherein the first reflector plane is in reflective communication with the object plane; and
 a second reflector plane coupled to the housing, wherein the second reflector plane is 68.0 to 70.0° from the object plane, wherein the second reflector plane is in reflective communication with the object plane.

Embodiment 25. The imaging device of any one of embodiments 18-24 and 26-29, wherein each of the first reflector plane and the second reflector plane have a distal end relative to the object plane, and the distal end of the first reflector plane is 67.5 mm to 70.5 mm from the distal end of the second reflector plane.

Embodiment 26. The imaging device of any one of embodiments 18-25 and 27-29, wherein a distance between a distal end of the first reflector plane and the object plane is 102.0 mm to 112.0 mm.

Embodiment 27. The imaging device of any one of embodiments 18-26 and 28-29, wherein the first reflector plane and second reflector plane each have a gloss of 81-88 at a 20° angle, in accordance with ASTM D 523-18.

Embodiment 28. The imaging device of any one of embodiments 18-27 and 29, further comprising an image capture device coupled to the housing, the image capture device having an optical lens, wherein a distance between the optical lens and the object plane is 166 mm to 178.0 mm.

Embodiment 29. The imaging device of any one of embodiments 18-28, further comprising a back illumination device coupled to the housing, wherein the back illumination device comprises a back emitter face opposite the object plane relative to the support plate, wherein the back emitter face is 1.5 mm to 4.5 mm from the object plane, and the back emitter face is configured to transmit diffuse light through the object plane.

Embodiment 30. An imaging device comprising:
 a support plate defining an object plane;
 a housing surrounding the object plane across the support plate;
 a first waveguide coupled to the housing, wherein the first waveguide comprises a first interior reflective surface, and the first waveguide defines a first optical inlet through the first interior reflective surface and a first optical outlet through the first interior reflective surface; and
 a first light source coupled to the first waveguide about the first optical inlet, wherein the first light source defines a first source emitter face that is radially outward from the first interior reflective surface relative to the first central axis.

Embodiment 31. The imaging device of any one of embodiments 30 and 32-44, wherein the first source emitter face is parallel to the first optical inlet.

Embodiment 32. The imaging device of any one of embodiments 30-31 and 33-44, wherein the first source emitter face is 1.2 mm to 2.2 mm radially outward from the first interior reflective surface relative to the first central axis.

Embodiment 33. The imaging device of any one of embodiments 30-32 and 34-44, further comprising:
 a second waveguide coupled to the housing, wherein the second waveguide comprises a second interior reflective surface, and the second waveguide defines a second optical inlet through the second interior reflective surface and a second optical outlet through the second interior reflective surface; and
 a second light source coupled to the second waveguide about the second optical outlet, wherein the second light source defines a second source emitter face that is radially outward from the second interior reflective surface relative to the second central axis.

Embodiment 34. The imaging device of any one of embodiments 30-33 and 35-44, wherein the second source emitter face is 1.2 mm to 2.2 mm radially outward from the second interior reflective surface relative to the second central axis.

Embodiment 35. The imaging device of any one of embodiments 30-34 and 36-44, wherein the first optical outlet is 11.5° to 14.5° from the object plane.

Embodiment 36. The imaging device of any one of embodiments 30-35 and 37-44, wherein the second optical outlet is 11.5° to 14.5° from the object plane.

Embodiment 37. The imaging device of any one of embodiments 30-36 and 38-44, wherein the first waveguide defines a first central axis that is 134.5 mm to 139.3 mm from a second central axis defined by the second waveguide.

Embodiment 38. The imaging device of any one of embodiments 30-37 and 39-44, wherein a distance between the object plane and a central axis defined by the first waveguide is 42.0 mm to 45.0 mm.

Embodiment 39. The imaging device of any one of embodiments 30-38 and 40-44, further comprising:
 a first reflector plane coupled to the housing, wherein the first reflector plane is 68.0° to 70.0° from the object plane, wherein the first reflector plane is in reflective communication with the object plane; and
 a second reflector plane coupled to the housing, wherein the second reflector plane is 68.0° to 70.0° from the object plane, wherein the second reflector plane is in reflective communication with the object plane.

Embodiment 40. The imaging device of any one of embodiments 30-39 and 41-44, wherein each of the first reflector plane and the second reflector plane have a distal end relative to the object plane, and the distal end of the first reflector plane is 67.5 mm to 70.5 mm from the distal end of the second reflector plane.

Embodiment 41. The imaging device of any one of embodiments 30-40 and 42-44, wherein a distance between a distal end of the first reflector plane and the object plane is 102.0 mm to 112.0 mm.

Embodiment 42. The imaging device of any one of embodiments 30-41 and 43-44, wherein the first reflector plane and second reflector plane each have a gloss of 81-88 at a 20° angle, in accordance with ASTM D 523-18.

Embodiment 43. The imaging device of any one of embodiments 30-42 and 44, further comprising an image capture device coupled to the housing, the image capture device having an optical lens, wherein a distance between the optical lens and the object plane is 166 mm to 178.0 mm.

Embodiment 44. The imaging device of any one of embodiments 30-43, further comprising a back illumination device coupled to the housing, wherein the back illumination device comprises a back emitter face opposite the object plane relative to the support plate, wherein the back emitter face is 21.5 mm to 4.5 mm from the object plane, and the back emitter face is configured to transmit diffuse light through the object plane.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. An imaging device comprising:
a support plate defining an object plane;
a housing surrounding the object plane across the support plate;
a first waveguide coupled to the housing, wherein the first waveguide comprises a first interior reflective surface, and the first waveguide defines a first optical inlet through the first interior reflective surface and a first optical outlet through the first interior reflective surface, wherein the first optical outlet is 11.5° to 14.5° from the object plane; and
a second waveguide coupled to the housing, wherein the second waveguide comprises a second interior reflective surface, and the second waveguide defines a second optical inlet through the second interior reflective surface and a second optical outlet through the second interior reflective surface, wherein the second optical outlet is 11.5° to 14.5° from the object plane.

2. The imaging device of claim 1, wherein the first waveguide defines a first central axis that is 134.5 mm to 139.3 mm from a second central axis defined by the second waveguide.

3. The imaging device of claim 1, wherein the first waveguide defines a first central axis and wherein a distance between the object plane and a central axis defined by the first waveguide is 42.0 mm to 45.0 mm.

4. The imaging device of claim 1, further comprising a first light source coupled to the first waveguide about the first optical inlet, wherein the first light source defines a first source emitter face that is radially outward from the first interior reflective surface relative to the first central axis.

5. The imaging device of claim 1, wherein the first source emitter face is 1.2 mm to 2.2 mm radially outward from the first interior reflective surface relative to the first central axis.

6. The imaging device of claim 1, further comprising a second light source coupled to the second waveguide about the second optical outlet, wherein the second light source defines a second source emitter face that is radially outward from the second interior reflective surface relative to the second central axis.

7. The imaging device of claim 1, further comprising:
a first reflector plane coupled to the housing, wherein the first reflector plane is 68.0° to 70.0° from the object plane, wherein the first reflector plane is in reflective communication with the object plane; and
a second reflector plane coupled to the housing, wherein the second reflector plane is 68.0 to 70.0° from the object plane, wherein the second reflector plane is in reflective communication with the object plane.

8. The imaging device of claim 7, wherein each of the first reflector plane and the second reflector plane have a distal end relative to the object plane, and the distal end of the first reflector plane is 67.5 mm to 70.5 mm from the distal end of the second reflector plane.

9. The imaging device of claim 7, wherein the first reflector plane and second reflector plane each have a gloss of 81-88 at a 20° angle, in accordance with ASTM D 523-18.

10. The imaging device of claim 1, wherein a distance between a distal end of the first reflector plane and the object plane is 102.0 mm to 112.0 mm.

11. The imaging device of claim 1, further comprising an image capture device coupled to the housing, the image capture device having an optical lens, wherein a distance between the optical lens and the object plane is 166 mm to 178.0 mm.

12. The imaging device claim 1, further comprising a back illumination device coupled to the housing, wherein the back illumination device comprises a back emitter face opposite the object plane relative to the support plate, wherein the back emitter face is 1.5 mm to 4.5 mm from the object plane, and the back emitter face is configured to transmit diffuse light through the object plane.

13. An imaging device comprising:
a support plate defining an object plane;
a housing surrounding the object plane across the support plate;
a first waveguide coupled to the housing, wherein the first waveguide comprises a first interior reflective surface, and the first waveguide defines a first optical inlet through the first interior reflective surface and a first optical outlet through the first interior reflective surface; and
a first light source coupled to the first waveguide about the first optical inlet, wherein the first light source defines a first source emitter face that is radially outward from the first interior reflective surface relative to the first central axis;
wherein the first source emitter face is 1.2 mm to 2.2 mm radially outward from the first interior reflective surface relative to the first central axis;
wherein the first optical outlet is 11.5° to 14.5° from the object plane.

14. The imaging device of claim 13, wherein the first source emitter face is parallel to the first optical inlet.

15. The imaging device of claim 13, further comprising:
a second waveguide coupled to the housing, wherein the second waveguide comprises a second interior reflective surface, and the second waveguide defines a second optical inlet through the second interior reflective surface and a second optical outlet through the second interior reflective surface; and
a second light source coupled to the second waveguide about the second optical outlet, wherein the second light source defines a second source emitter face that is radially outward from the second interior reflective surface relative to the second central axis;
wherein the second optical outlet is 11.5° to 14.5° from the object plane; and
wherein the first waveguide defines a first central axis that is 134.5 mm to 139.3 mm from a second central axis defined by the second waveguide.

16. The imaging device of claim 15, wherein the second source emitter face is 1.2 mm to 2.2 mm radially outward from the second interior reflective surface relative to the second central axis.

17. The imaging device of claim 13, wherein a distance between the object plane and a central axis defined by the first waveguide is 42.0 mm to 45.0 mm.

18. The imaging device of claim 13, further comprising:
a first reflector plane coupled to the housing, wherein the first reflector plane is 68.0° to 70.0° from the object plane, wherein the first reflector plane is in reflective communication with the object plane; and
a second reflector plane coupled to the housing, wherein the second reflector plane is 68.0° to 70.0° from the object plane, wherein the second reflector plane is in reflective communication with the object plane;
wherein each of the first reflector plane and the second reflector plane have a distal end relative to the object plane, and the distal end of the first reflector plane is 67.5 mm to 70.5 mm from the distal end of the second reflector plane; and
wherein the first reflector plane and second reflector plane each have a gloss of 81-88 at a 20° angle, in accordance with ASTM D 523-18.

19. The imaging device of claim 13, wherein a distance between a distal end of the first reflector plane and the object plane is 102.0 mm to 112.0 mm.

20. The imaging device of claim 13, further comprising an image capture device coupled to the housing, the image capture device having an optical lens, wherein a distance between the optical lens and the object plane is 166 mm to 178.0 mm.

21. The imaging device of claim 13, further comprising a back illumination device coupled to the housing, wherein the back illumination device comprises a back emitter face opposite the object plane relative to the support plate, wherein the back emitter face is 1.5 mm to 4.5 mm from the object plane, and the back emitter face is configured to transmit diffuse light through the object plane.

\* \* \* \* \*